United States Patent [19]

Hirosaki et al.

[11] Patent Number: 5,545,362
[45] Date of Patent: Aug. 13, 1996

[54] PRODUCTION METHOD OF SINTERED SILICON NITRIDE

[75] Inventors: Naoto Hirosaki; Akira Okada; Yoshio Akimune, all of Yokohama, Japan

[73] Assignee: Nissan Motor Company, Yokohama, Japan

[21] Appl. No.: 143,233

[22] Filed: Oct. 29, 1993

Related U.S. Application Data

[63] Continuation of Ser. No. 610,638, Nov. 8, 1990, abandoned.

[30] Foreign Application Priority Data

Dec. 8, 1989 [JP] Japan ................... 1-320047

[51] Int. Cl.$^6$ ............ C04B 35/584; C04B 35/594
[52] U.S. Cl. ............... 264/65; 264/570; 501/97; 501/98
[58] Field of Search .............. 264/65, 570; 501/97, 501/98

[56] References Cited

U.S. PATENT DOCUMENTS

| | | | |
|---|---|---|---|
| 4,025,351 | 5/1977 | Masaki | 501/97 |
| 4,341,874 | 7/1982 | Nishida et al. | 501/98 |
| 4,351,787 | 9/1982 | Martinengo et al. | 264/65 |
| 4,500,482 | 2/1985 | Hüther | 264/65 |
| 4,716,133 | 12/1987 | Horiuchi | 501/97 |
| 4,734,234 | 3/1988 | Sterzel | 264/65 |
| 4,795,724 | 1/1989 | Soma | 264/65 |
| 5,126,294 | 6/1992 | Hirosaki | 501/97 |

FOREIGN PATENT DOCUMENTS

| | | |
|---|---|---|
| 49-63710 | 1/1974 | Japan . |
| 54-15916 | 6/1979 | Japan . |
| 60-137873 | 3/1985 | Japan . |

*Primary Examiner*—James Derrington
*Attorney, Agent, or Firm*—Pennie & Edmonds

[57] ABSTRACT

A sintered silicon nitride excellent in high temperature performance is produced by the following method: First, silicon nitride powder and oxide of at least one element selected from elements in the group IIIb of a periodic table are mixed with each other to obtain a mixture. The silicon nitride powder contains silicon oxide in an amount ranging from 0.1% by weight of the silicon nitride powder to a value not more than a content of the silicon oxide. Second, the mixture is compacted to form a compact. Finally, the compact is fired in atmosphere of nitrogen at a pressure ranging from 5 to 200 atmosphere (atm) and a temperature ranging from 1800° to 2000° C. to obtain a sintered silicon nitrite having a bulk density not less than 95% of a theoretical density of the sintered silicon nitride.

4 Claims, 1 Drawing Sheet

PRODUCTION METHOD OF SINTERED SILICON NITRIDE

This is a continuation of application Ser. No. 07/610,638, filed Nov. 8, 1990, now abandoned.

BACKGROUND OF THE INVENTION

1. Field of the Invention

This invention relates to a production method of a sintered silicon nitride which has a high temperature strength and suitable for a material of so-called fine ceramic structural parts which are usable throughout a wide industrial field including automobiles, mechanical apparatuses, chemical apparatuses and aeronautical and astronautical apparatuses.

2. Description of the Prior Art

Sintered silicon nitrides whose main component is silicon nitride are chemically stable and high in mechanical strength at ordinary and high temperatures, and therefore are suitable for a material of sliding parts such as bearings and engine parts such as rotors of turbochargers. Since silicon nitride is difficult to be singly sintered, it is usually sintered upon adding a considerable amount of sintering assistants such as MgO, $Al_2O_3$ and $Y_2O_3$. Such sintering method is disclosed, for example, in Japanese Patent Provisional Publication Nos. 49-63710, 54-15916 and 60-137873.

However, in the conventional sintered silicon nitride produced by adding a considerable amount of the sintered assistants such as MgO, $Al_2O_3$ and $Y_2O_3$, there exists a considerable amount of oxides in grain boundary in the sintered silicon nitride. These oxides promote oxidation of silicon nitride at high temperatures. As a result, structual parts formed of such a sintered silicon nitride are unavoidably low in high temperature performance such as creep resistance, high temperature strength and oxidation resistance.

SUMMARY OF THE INVENTION

It is an object of the present invention to provide an improved method of producing a sintered silicon nitride, by which a resultant sintered silicon nitride is excellent in strength at ordinary and high temperatures and less in strength-lowering at high temperatures while being excellent in oxidation resistance.

A method of producing a sintered silicon nitride, according to the present invention is comprised of the following steps: First, silicon nitride powder and oxide of at least one element selected from elements in the group IIIb of a periodic table of the elements are mixed with each other to obtain a mixture. The silicon nitride powder contains silicon oxide in an amount ranging from 0.5 to 4.0% by weight. The oxide of the periodic table group IIIb element is in amount ranging from 0.1% by weight of the silicon nitride powder to a value not more than a content of the silicon oxide. Second, the mixture is compacted to form a compact. Finally, the compact is fired in atmosphere of nitrogen at a pressure ranging from 5 to 200 atmosphere (atm) and a temperature ranging from 1800° to 2000° C. to obtain a sintered silicon nitride having a bulk density not less than 95% of a theoretical density of the sintered silicon nitride.

According to the sintered silicon nitride production method of the present invention, the content of silicon oxide in the silicon nitride powder and the type and the added amount of oxide sintering assistants added to the silicon nitride are controlled in preparation of starting or raw material. Additionally, the pressure of atmospheric gas and the firing temperature are controlled in firing the compact thereby to obtain a minute structure of the sintered silicon nitride having the bulk density not less than 95% of the theoretical density. The resultant sintered silicon nitride has in grain boundary thereof particular oxide which is excellent in heat resistance and oxidation resistance. Accordingly, the resultant sintered silicon nitride are not only high in strength at ordinary temperature but also much less in strength-lowering at high temperatures. Additionally, the resultant sintered silicon nitride is excellent in oxidation resistance. Therefore, the sintered silicon nitride can be used for a material of so-called fine ceramics which requires an excellent high temperature performance such as a creep resistance, a high temperature strength, a heat resistance and an oxidation resistance. The material is suitable for a variety of structural parts subjected to high temperatures and greatly contributes to a weight-lightening of such structural parts.

DETAILED DESCRIPTION OF THE INVENTION

Figure 1:
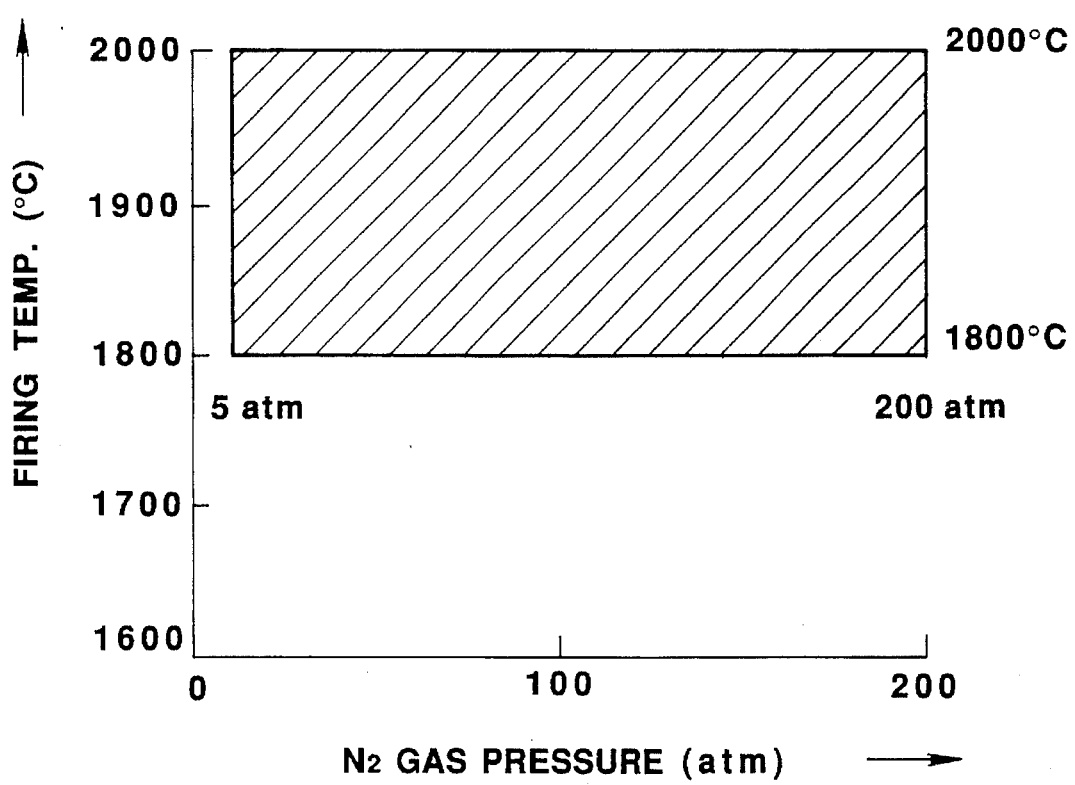
FIG. 1 (a single figure) is a graph showing a firing condition of a compact in a production method of the present invention, in terms of firing temperature and pressure of nitrogen gas.

According to the present invention, there is provided a method of producing a sintered silicon nitride. The method is comprised of the following steps: (1) Silicon nitride powder and oxide of at least one element selected from elements in the group IIIb of the periodic table of the elements are mixed to obtain a mixture. The silicon nitride powder contains silicon oxide in an amount ranging from 0.5 to 4.0% by weight. The oxide of the group IIIb element is in an amount ranging from 0.1% by weight of the silicon nitride powder to a value not more than the content of the silicon oxide. (2) The mixture is compacted to form a compact. (3) The compact is fired in atmosphere of nitrogen at a pressure ranging from 5 to 200 atmosphere (atm) and a temperature ranging from 1800° to 2000° C. to obtain a sintered silicon nitride having a bulk density not less than 95% of a theoretical density of the sintered silicon nitride.

In general, oxidation of a sintered body or compact is evaluated by an increase in weight of the sintered body. More specifically, when a sintered silicon nitride is heated at high temperatures in the atmosphere containing oxygen, silicon nitride is oxidized according to a reaction of a chemical equation shown below to exhibit a weight increase.

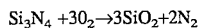

$$Si_3N_4 + 3O_2 \rightarrow 3SiO_2 + 2N_2$$

Accordingly, it is demonstrated that an oxidation resistance of the sintered body is higher as the above-mentioned weight increase is less. In oxidation of silicon nitride, a mass transfer is made through an oxide grain boundary phase, so that the composition of the grain boundary greatly affects oxidation of the sintered body.

According to the present invention, the content of silicon oxide contained in silicon nitride powder and the added amount or content of the oxide of periodic table group IIIb element (or elements) are controlled to form an oxide high in heat resistance and high in oxidation resistance in the grain boundary of the sintered silicon nitride, thereby improving an oxidation resistance of the sintered silicon nitride.

In the production method of the sintered silicon nitride of the present invention, starting or raw materials are silicon nitride powder and the oxide(s) of one or more elements in the group IIIb of a periodic table of the elements. It is preferable that the content of impurity metallic elements and of oxygen in the silicon nitride powder is as small as possible. The silicon nitride powder used in the present invention contains silicon oxide in an amount ranging from 0.5 to 4.0% by weight. This content is determined for the reasons set forth below. If the content of silicon oxide is less than 0.5% by weight, a sufficiently minute structure of the sintered silicon nitride can be obtained. If it is more than 4.0% by weight, a strength of the sintered silicon nitride at high temperatures is lowered.

Examples of the periodic table group IIIb elements as a starting material are Sc, Y, Lanthanides (having atomic numbers of from 57 to 71), Actinides (having atomic numbers of from 89 to 103) and the like. Of these elements, Y, La, Nd, Sm and the like are usually used from the view point of availability and treating ability.

The oxide(s) of the periodic table group IIIb element(s) serves as sintering assistant(s). Only one oxide may be used for this purpose; however, it is preferable to use two or more oxides for the same purpose if the amount of such oxide sintering assistants is less. The added amount or content of the oxide(s) of the periodic table group IIIb element (s) is within a range from 0.1% by weight of the silicon nitride powder (containing silicon oxide) to a value not more than the content of the silicon oxide in the silicon nitride powder. This added amount (content) of the oxide(s) is determined for the reasons set forth below. If the added amount is less than 0.1% by weight, a sufficient minute structure of the sintered silicon nitride cannot be obtained. If it is more than the content of the silicon oxide, the silicon oxide becomes less in grain boundary of the sintered silicon nitride thereby degrading an oxidation resistance of the sintered silicon nitride.

The silicon nitride powder and the oxide(s) of the periodic table group IIIb element(s) as the starting materials are mixed in amounts defined above to form a mixture. The mixture is then compacted to obtain a compact. In order to compact the mixture, one of usual compacting methods for ceramic powder is selected according to shape and the like of a product to be manufactured. Accordingly, no special method is required to carry out the production method of the present invention. In this connection, the usual compacting methods include metallic mold press compacting, rubber press compacting, and injection molding compacting.

The thus compacted mixture is fired in the atmosphere of nitrogen at a pressure ranging from 5 to 200 atmosphere (atm) and at a temperature ranging from 1800° to 2000 ° C. as shown in FIG. 1. This firing is continued until the bulk density of the sintered silicon nitride becomes not less than 95% of a theoretical density of the sintered silicon nitride. The pressure range is determined for the reasons set forth below. If the pressure is lower than 5 atmospheric pressures, a thermal decomposition of silicon nitride tends to occur so that a sufficiently minute structure of the sintered silicon nitride cannot be obtained. If the pressure is higher than 200 atmospheric pressure, a terminal sintering of the silicon nitride is hampered thereby lowering the density of the sintered silicon nitride. Additionally, the temperature range is determined for the reasons set forth below. If the firing temperature is lower than 1800° C., a sufficient amount of liquid phase cannot be formed and therefore a sufficiently minute structure of the sintered silicon nitride cannot be formed. If the firing temperature is higher than 2000° C., a grain growth tends to occur thereby degrading the strength of the sintered silicon nitride.

The above-discussed firing is continued until sintering of silicon nitride has sufficiently proceeded to obtain a minute structure sintered silicon nitride having a bulk density not less than 95% of a theoretical density of the sintered silicon nitride. If the bulk density is less than 95% of the theoretical density, the strength of the sintered silicon nitride is not sufficient at room temperature and at high temperatures.

Here, the bulk density and the theoretical density used in the present invention will be discussed.

The bulk density ($D_b$) of the sintered silicon nitride is determined by the following equation (1):

$$\text{Bulk density } (D_b) = \frac{A}{V} \quad (1)$$

where A is the weight of the sintered silicon nitride in air; and V is the volume of the sintered silicon nitride and given by the following equation (2):

$$\text{Volume } (V) = \frac{A - B}{C} \quad (2)$$

where B is the weight of the sintered silicon nitride in water; and C is the density of water.

The theoretical density ($D_t$) of the sintered silicon nitride is determined by the following equation (3):

$$\text{Theoretical density } (D_t) = \frac{T_w}{T_v} \quad (3)$$

where $T_w$ is the total weight of starting materials (such as $Si_3N_4$, $Y_2O_3$, $Nd_2O_3$ and the like); and $T_v$ is the total theoretical volume of the starting materials, the theoretical volume ($V_t$) of each starting material being given by the following equation (4):

$$\text{Theoretical volume } (V_t) = \frac{w}{g_s} \quad (4)$$

where w is the weight of the starting material; and $g_s$ is the specific gravity of the starting material.

Thus, the sintered silicon nitride obtained according to the production method of the present invention has the bulk density not less than 95% of the theoretical density and is formed with an oxide high in heat resistance and oxidation resistance in grain boundary of the sintered silicon nitride. Accordingly, the sintered silicon nitride is remarkably excellent in creep resistance, high temperature strength, heat resistance, and oxidation resistance.

In order to evaluate the sintered silicon nitride of the present invention, Examples 1 to 56 according to the present invention will be discussed in comparison with Comparative Examples 1 to 6 which are not within the scope of the present invention.

EXAMPLES AND COMPARATIVE EXAMPLES

Oxide sintering assistants shown in Table 1 was added to silicon nitride powder A (principal component) containing 3.5% by weight of silicon oxide and having an average particle size of 1.0 μm (corresponding to Examples 1 to 51 and Comparative Examples 57 to 62) or to silicon nitride powder B (principal component) containing 2.5% by weight of silicon oxide and having an average particle size of 1.5 μm (corresponding to Examples 52 to 56) and mixed with each other in ethanol for 24 hours by using a ball mill to obtain a mixture. After drying, the mixture was compacted at a pressure of 20 MPa by using a metallic die and thereafter compacted at a pressure of 200 MPa by means of a rubber press thereby to obtain a compact having a dimension of 6 mm×6 mm×50 mm.

Subsequently, the thus obtained compact was fired in the atmosphere of nitrogen at a pressure of a firing condition 1, 2 or 3 shown in Table 2, in which the temperature was raised at a rising rate of 500° C./hr. The firing was carried out at a firing temperature and for a time under the firing condition 1, 2 or 3 shown in Table 2 thus obtaining a sintered silicon nitride. As shown in Table 1, the firing condition 1 was employed in Examples 1 to 48 and Comparative Examples 57 to 62; the firing condition 2 was employed in Examples 49 to 51; and the firing condition 3 was employed in Examples 52 to 56.

The thus obtained sintered silicon nitride was subjected to a measurement of a percentage value of the bulk density relative to the theoretical density and to a measurement of a total oxygen content by an oxygen analyzer. The results of the measurements are shown in Table 1.

Next, the sintered silicon nitride was machined and ground to obtain a test piece having a dimension of 3 mm×4 mm×40 mm by using a diamond wheel, and subjected to a so-called three point bending test (span: 30 mm) at room temperature and at a temperature of 1400° C. to obtain a bending strength. The bending test was conducted on five specimens of the sintered silicon nitride to obtain an average value of the five measured values. The results (bending strengths) of this test are shown in Table 1.

Additionally, the test piece having the dimension of 3 mm×4 mm×40 mm was heated at 1300° C. for 100 hours in atmospheric air. Then, a change in weight (an weight increase due to oxidation) of the test piece upon heating was measured. The results of this test are shown in Table 1.

TABLE 1

| Item | Principal component Si₃N₄ | Y₂O₃ | La₂O₃ | CeO₂ | Pr₆O₁₁ | Nd₂O₃ | Sm₂O₃ | Gd₂O₃ | Dy₂O₃ | Ho₂O₃ | Er₂O₃ | Yb₂O₃ | Al₂O₃ | MgO | Firing Condition (No.) | Total oxygen content (wt %) | Bulk density (%) | Strength at room temp. (MPa) | Strength at high temp. (MPa) | Weight increase (mg) |
|---|---|---|---|---|---|---|---|---|---|---|---|---|---|---|---|---|---|---|---|---|
| Example 1 | A | 1.5 | 2.0 | | | | | | | | | | | | 1 | 1.2 | 96.5 | 780 | 690 | 0.31 |
| 2 | A | 1.5 | | 2.0 | | | | | | | | | | | 1 | 1.0 | 97.3 | 740 | 520 | 0.20 |
| 3 | A | 1.5 | | | 2.0 | | | | | | | | | | 1 | 1.3 | 98.2 | 770 | 660 | 0.34 |
| 4 | A | 1.5 | | | | 2.0 | | | | | | | | | 1 | 0.9 | 16.3 | 750 | 530 | 0.21 |
| 5 | A | 1.5 | | | | | 2.0 | | | | | | | | 1 | 1.1 | 95.8 | 770 | 570 | 0.27 |
| 6 | A | 1.5 | | | | | | 2.0 | | | | | | | 1 | 1.0 | 96.9 | 830 | 740 | 0.43 |
| 7 | A | 1.5 | | | | | | | 2.0 | | | | | | 1 | 1.0 | 96.3 | 730 | 640 | 0.42 |
| 8 | A | 1.5 | | | | | | | | 2.0 | | | | | 1 | 1.0 | 98.0 | 750 | 580 | 0.34 |
| 9 | A | 1.5 | | | | | | | | | 2.0 | | | | 1 | 0.9 | 97.5 | 800 | 610 | 0.39 |
| 10 | A | 1.5 | | | | | | | | | | 2.0 | | | 1 | 1.2 | 98.5 | 900 | 710 | 0.36 |
| 11 | A | | 1.5 | 2.0 | | | | | | | | | | | 1 | 1.2 | 97.0 | 890 | 630 | 0.38 |
| 12 | A | | 1.5 | | 2.0 | | | | | | | | | | 1 | 1.0 | 97.2 | 880 | 700 | 0.33 |
| 13 | A | | 1.5 | | | 2.0 | | | | | | | | | 1 | 1.2 | 98.2 | 740 | 520 | 0.29 |
| 14 | A | | 1.5 | | | | 2.0 | | | | | | | | 1 | 0.9 | 96.9 | 730 | 530 | 0.18 |
| 15 | A | | 1.5 | | | | | 2.0 | | | | | | | 1 | 1.0 | 97.1 | 750 | 610 | 0.37 |
| 16 | A | | 1.5 | | | | | | 2.0 | | | | | | 1 | 1.2 | 95.8 | 750 | 560 | 0.27 |
| 17 | A | | 1.5 | | | | | | | 2.0 | | | | | 1 | 1.0 | 98.4 | 760 | 620 | 0.21 |
| 18 | A | | 1.5 | | | | | | | | 2.0 | | | | 1 | 1.2 | 98.2 | 870 | 700 | 0.29 |
| 19 | A | | 1.5 | | | | | | | | | 2.0 | | | 1 | 0.9 | 96.8 | 810 | 590 | 0.33 |
| 20 | A | | | 1.5 | 2.0 | | | | | | | | | | 1 | 0.9 | 98.3 | 730 | 530 | 0.28 |
| 21 | A | | | 1.5 | | 2.0 | | | | | | | | | 1 | 1.2 | 97.8 | 890 | 750 | 0.49 |
| 22 | A | | | 1.5 | | | 2.0 | | | | | | | | 1 | 1.1 | 97.9 | 810 | 610 | 0.30 |
| 23 | A | | | 1.5 | | | | 2.0 | | | | | | | 1 | 1.1 | 95.4 | 760 | 550 | 0.28 |
| 24 | A | | | 1.5 | | | | | 2.0 | | | | | | 1 | 0.9 | 96.2 | 760 | 540 | 0.26 |
| 25 | A | | | 1.5 | | | | | | 2.0 | | | | | 1 | 1.0 | 96.0 | 790 | 550 | 0.35 |
| 26 | A | | | 1.5 | | | | | | | 2.0 | | | | 1 | 1.0 | 95.8 | 780 | 680 | 0.39 |
| 27 | A | | | 1.5 | | | | | | | | 2.0 | | | 1 | 1.0 | 98.2 | 780 | 600 | 0.28 |
| 28 | A | | 1.5 | 1.5 | 1.5 | 1.5 | | | | | | | | 1 | 1 | 1.0 | 97.9 | 770 | 640 | 0.38 |
| 29 | A | | 1.5 | 1.5 | 1.5 | | 1.5 | | | | | | | 1 | 1 | 1.2 | 97.1 | 900 | 730 | 0.31 |
| 30 | A | | 1.5 | 1.5 | 1.5 | | | 1.5 | | | | | | 1 | 1 | 1.1 | 96.8 | 840 | 660 | 0.34 |
| 31 | A | | 1.5 | 1.5 | 1.5 | | | | 2.0 | | | | | 1 | 1 | 0.9 | 98.6 | 800 | 610 | 0.35 |
| 32 | A | | | | | 1.5 | 1.5 | | | | | | | | 1 | 1.2 | 96.5 | 760 | 540 | 0.39 |
| 33 | A | | | | | 1.5 | | 1.5 | | | | | | | 1 | 1.1 | 95.8 | 840 | 590 | 0.20 |
| 34 | A | | | | | | 1.5 | 1.5 | | | | | | | 1 | 1.2 | 98.5 | 750 | 550 | 0.26 |
| 35 | A | | | | | | 1.5 | | 2.0 | | | | | | 1 | 0.9 | 98.6 | 820 | 650 | 0.31 |
| 36 | A | | | | | | 1.5 | | | 2.0 | | | | | 1 | 1.0 | 98.3 | 920 | 750 | 0.22 |
| 37 | A | | | | | | 1.5 | | | | 2.0 | | | | 1 | 1.2 | 98.0 | 740 | 630 | 0.45 |
| 38 | A | | | | | | 1.5 | | | | | 2.0 | | | 1 | 1.2 | 97.4 | 840 | 710 | 0.46 |
| 39 | A | | | | | | | 1.5 | 2.0 | | | | | | 1 | 1.3 | 98.0 | 910 | 820 | 0.31 |
| 40 | A | | | | | | | 1.5 | | 2.0 | | | | | 1 | 1.2 | 97.0 | 850 | 760 | 0.28 |
| 41 | A | | | | | | | 1.5 | | | 2.0 | | | | 1 | 1.0 | 96.8 | 760 | 610 | 0.29 |
| 42 | A | | | | | | | 1.5 | | | | 2.0 | | | 1 | 1.0 | 98.5 | 800 | 580 | 0.43 |
| 43 | A | | | | | | | | 1.5 | 2.0 | | | | | 1 | 0.9 | 98.3 | 920 | 760 | 0.35 |
| 44 | A | | | | | | | | 1.5 | | 2.0 | | | | 1 | 0.8 | 98.5 | 850 | 610 | |

TABLE 1-continued

| | | Composition (wt. %) | | | | | | | | | | | | | | Firing | Total | Bulk | Strength | Strength | Weight |
|---|---|---|---|---|---|---|---|---|---|---|---|---|---|---|---|---|---|---|---|---|---|
| | Principal component | | | | | | Oxide sintering assistant | | | | | | | | | Con-dition | oxygen content | density | at room temp. | at high temp. | increase |
| Item | Si$_3$N$_4$ | Y$_2$O$_3$ | La$_2$O$_3$ | CeO$_2$ | Pr$_6$O$_{11}$ | Nd$_2$O$_3$ | Sm$_2$O$_3$ | Gd$_2$O$_3$ | Dy$_2$O$_3$ | Ho$_2$O$_3$ | Er$_2$O$_3$ | Yb$_2$O$_3$ | Al$_2$O$_3$ | MgO | (No.) | (wt %) | (%) | (MPa) | (MPa) | (mg) |
| 45 | A | | | | | | | | 1.5 | | | 2.0 | | | 1 | 1.0 | 98.6 | 910 | 710 | 0.39 |
| 46 | A | | | | | | | | | 1.5 | 2.0 | | | | 1 | 1.1 | 95.9 | 750 | 650 | 0.40 |
| 47 | A | | | | | | | | | 1.5 | | 2.0 | | | 1 | 1.1 | 96.2 | 880 | 650 | 0.41 |
| 48 | A | | | | | | | | | | 1.5 | 2.0 | | | 1 | 1.1 | 96.0 | 800 | 640 | 0.36 |
| 49 | A | | 3.0 | | | | | | | | | | | | 2 | 0.9 | 95.6 | 760 | 680 | 0.25 |
| 50 | A | | | 3.0 | | | | | | | | | | | 2 | 1.3 | 95.3 | 770 | 650 | 0.23 |
| 51 | A | | | | 3.0 | | | | | | | | | | 2 | 0.8 | 95.8 | 790 | 570 | 0.21 |
| 52 | B | 0.5 | | | | | | | | | | | | | 3 | 0.6 | 95.4 | 790 | 660 | 0.30 |
| 53 | B | 0.5 | 1.0 | | | | | | | | | | | | 3 | 0.6 | 95.8 | 780 | 680 | 0.33 |
| 54 | B | 0.5 | | 1.0 | | | | | | | | | | | 3 | 0.5 | 95.8 | 760 | 680 | 0.36 |
| 55 | B | 0.5 | | | | 0.5 | | | | | | | | | 3 | 0.5 | 95.4 | 840 | 640 | 0.29 |
| 56 | B | 0.3 | | | | | 0.5 | | | | | 0.3 | | | 3 | 0.6 | 96.9 | 870 | 740 | 0.35 |
| Comparative Example 1 | A | 10.0 | | | | | | | | | | | 5.0 | | 1 | 4.8 | 99.3 | 840 | 120 | 2.30 |
| 2 | A | 10.0 | | | | | | | | | | | | 5.0 | 1 | 5.8 | 97.8 | 850 | 80 | 3.50 |
| 3 | A | 10.0 | | 5.0 | | | | | | | | | | | 1 | 5.2 | 95.6 | 770 | 530 | 1.30 |
| 4 | A | 3.0 | | | | | | | | | | | 3.0 | | 1 | 2.2 | 98.5 | 780 | 230 | 1.50 |
| 5 | A | 3.0 | 3.0 | | | | | | | | | | | | 1 | 2.0 | 94.2 | 820 | 480 | 0.90 |
| 6 | A | 3.0 | | 3.0 | | | | | | | | | | | 1 | 2.2 | 99.3 | 880 | 450 | 0.83 |

TABLE 2

| No. | Firing condition | | |
| --- | --- | --- | --- |
| | Temp. (°C.) | Time (hr) | Nitrogen gas pressure (atm) |
| 1 | 1900 | 4 | 100 |
| 2 | 1850 | 4 | 50 |
| 3 | 1950 | 2 | 200 |

As demonstrated in Table 1, in all the sintered silicon nitride according to Examples 1, to 56 meeting the producing conditions of the present invention, the total oxygen content is less; the bulk density is not less than 95% of the theoretical density; the strength lowering at high temperatures is less and therefore the high temperature strength is high; and the weight increase due to oxidation is less and therefore an oxidation resistance is higher. To the contrary, in the sintered silicon nitrides according to Comparative Examples 1 to 6 in which the content of the oxide sintering assistants is larger than that of the silicon oxide, an oxygen amount in the sintered silicon oxide is larger and accordingly a large amount oxide component resides in grain boundary. As a result, the sintered silicon nitrides are excessive thus strength-lowering at high temperatures and degrading in oxidation resistance.

What is claimed is:

1. A method of producing a sintered silicon nitride, comprising the following steps in the sequence set forth:

mixing silicon nitride powder and oxide of at least one element selected from elements in the group IIIb of the periodic table of the elements to obtain a mixture, said silicon nitride powder containing silicon oxide in an amount ranging from 0.5 to 40% by weight of said silicon nitride, of said periodic table group IIIb element being in an amount ranging from 0.1% by weight of said silicon nitride powder to a value less than or equal to the content of said silicon oxide;

compacting said mixture to form a compact; and firing said compact in atmosphere of nitrogen at a pressure ranging from 5 to 200 atmosphere (atm) and at a temperature ranging from 1800° to 2000° C. to obtain the sintered silicon nitride having a bulk density not less than 95% of a theoretical density of said sintered silicon nitride.

2. A method as claimed in claim 1, wherein said compact is fired for a time ranging from about 2 to about 4 hours.

3. A method as claimed in claim 1, wherein said at least one element is selected from the group consisting of Sc, Y, elements of Lanthanides and elements of Actinides.

4. A method as claimed in claim 1, wherein said at least one element is selected from the group consisting of Y, La, Nd and Sm.

* * * * *